June 30, 1970   W. D. KIRKENDALL   3,518,605
POTENTIOMETERS

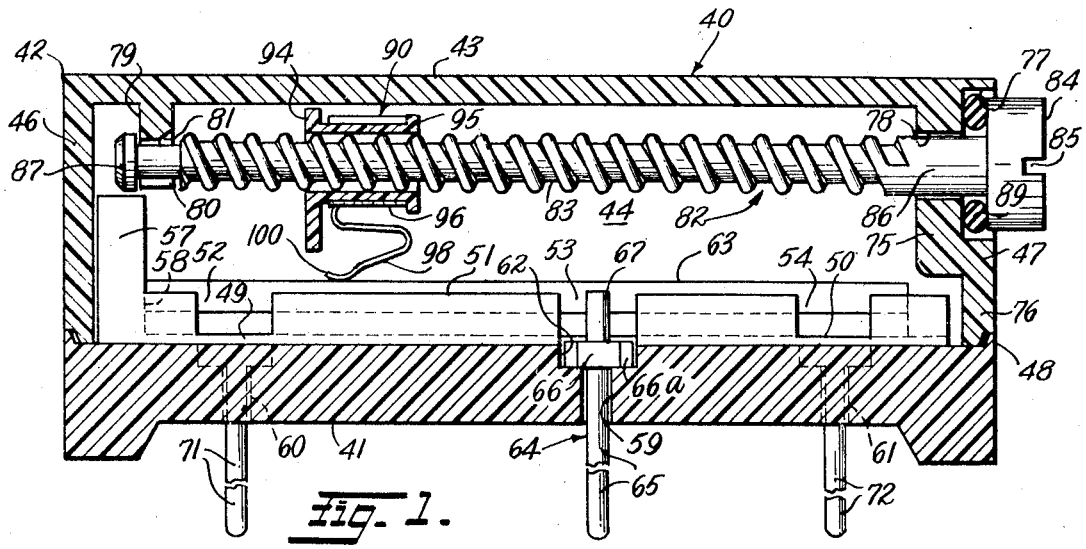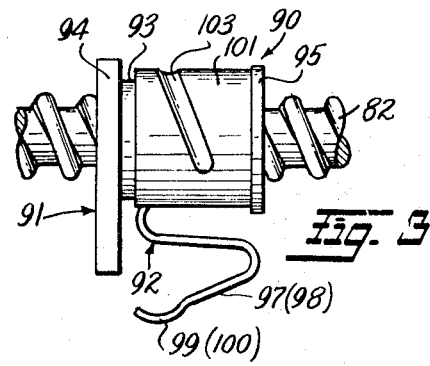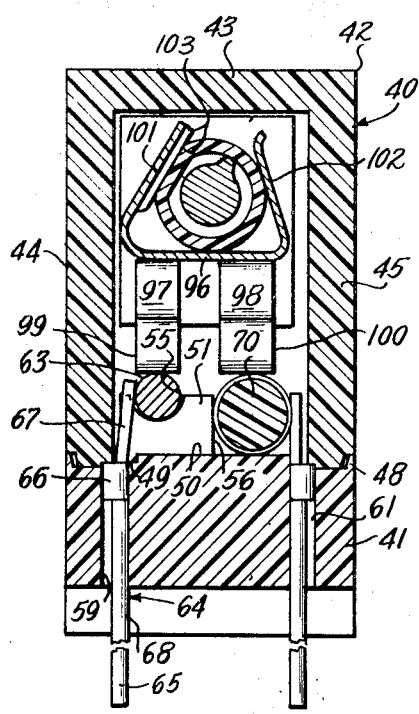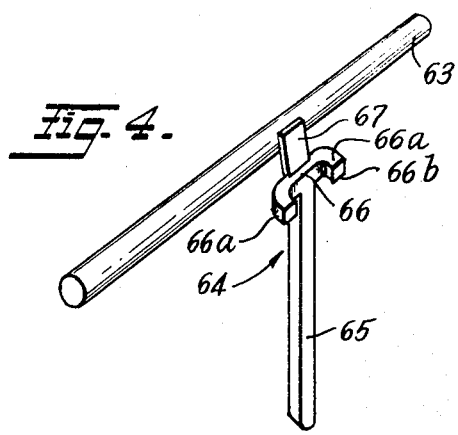

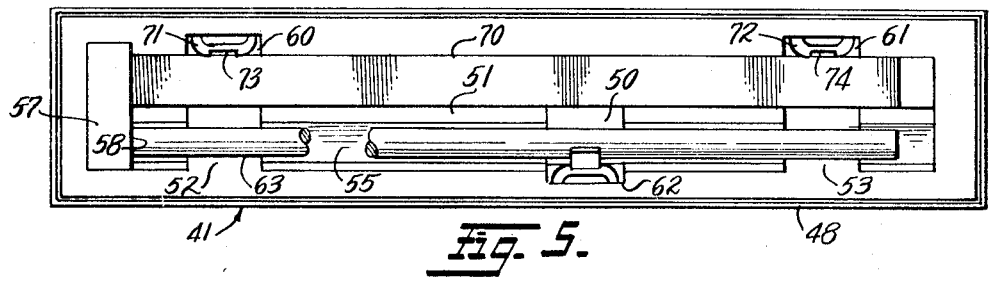
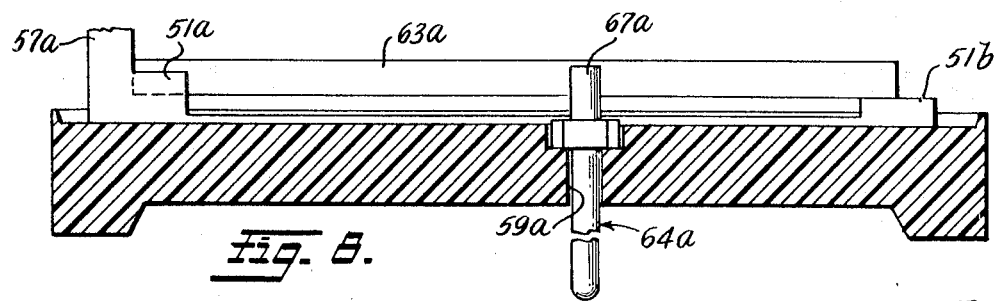
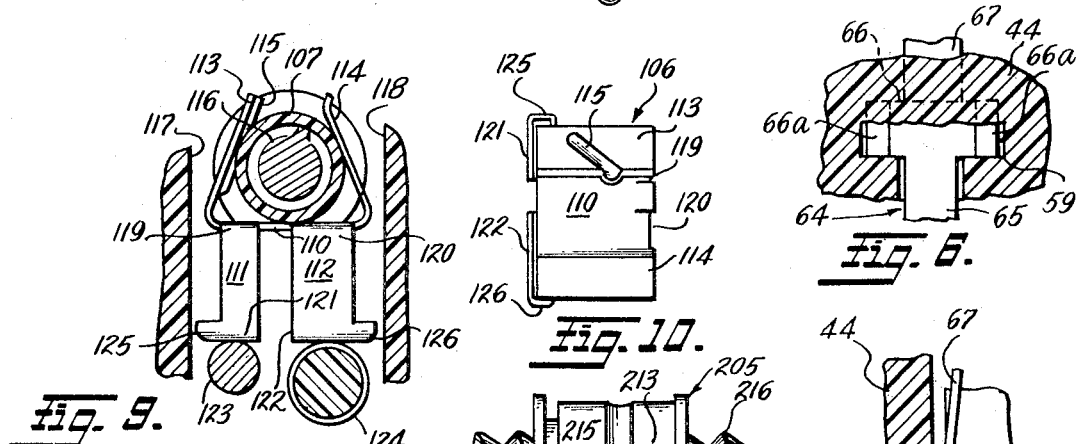
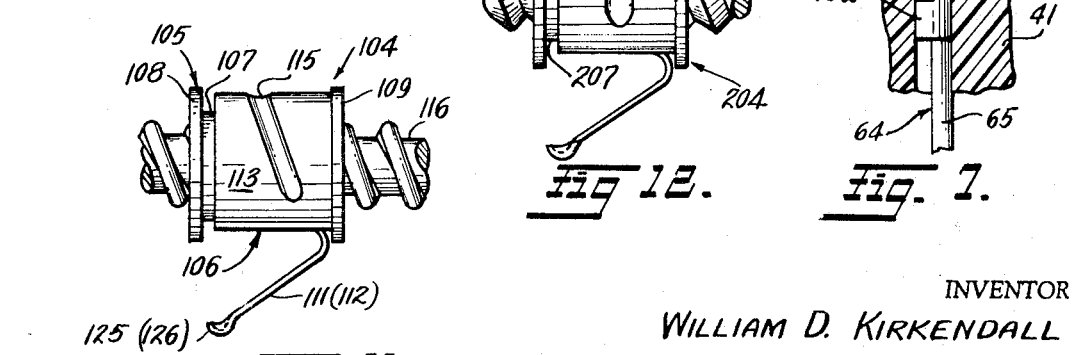
INVENTOR
WILLIAM D. KIRKENDALL

Filed Feb. 5, 1968   3 Sheets-Sheet 3

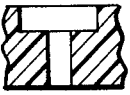
Fig.13A. PROVIDE BASE MEMBER OF THERMOPLASTIC POLYMERIC MATERIAL, WITH BASE HAVING THROUGH OPENING HAVING TRANSVERSE ENLARGEMENT AT UPPER SURFACE OF BASE

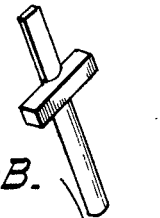
Fig.13B. INSERT LEAD ELEMENT HAVING TRANSVERSE EXTENSION DOWNWARDLY INTO THROUGH OPENING UNTIL TRANSVERSE EXTENSION OF LEAD ELEMENT IS DISPOSED IN ENLARGEMENT OF THROUGH OPENING

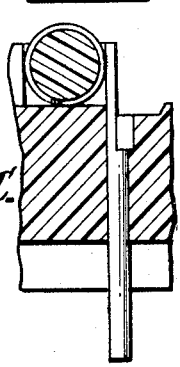
Fig.13C. CONNECT ELECTRICAL COMPONENT TO LEAD ELEMENT, AS BY WELDING

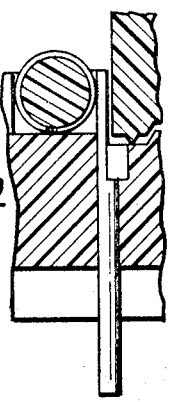
Fig.13D. PROVIDE CAP OF THERMOPLASTIC POLYMERIC MATERIAL AND INCLUDING SIDE WALL PORTION, AND PLACE CAP ON BASE WITH EDGE OF WALL PORTION EXTENDING ACROSS ENLARGEMENT OF OPENING AND OVERLYING TRANSVERSE EXTENSION OR LEAD ELEMENT

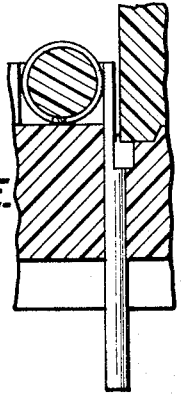
Fig.13E. APPLY FORCE TO CAP AND BASE TO URGE EDGE OF WALL PORTION AGAINST BASE AND, WHILE MAINTAINING THAT FORCE, FUSE POLYMERIC MATERIAL OF EDGE OF PORTION TO SECURE CAP TO BASE, PARTIALLY EMBED TRANSVERSE EXTENSION IN THE FUSED POLYMERIC MATERIAL, AND RIGIDLY SECURE TRANSVERSE EXTENSION IN SEATED POSITION IN ENLARGEMENT OF OPENING

INVENTOR
WILLIAM D. KIRKENDALL

BY Arnold, Roylance, Kruger & Durkee
ATTORNEYS

United States Patent Office 3,518,605
Patented June 30, 1970

1

3,518,605
POTENTIOMETERS
William D. Kirkendall, Dalton, Pa., assignor to Weston Instruments, Inc., Newark, N.J., a corporation of Delaware
Filed Feb. 5, 1968, Ser. No. 702,913
Int. Cl. H01c 5/02, 17/00
U.S. Cl. 338—183                          13 Claims

ABSTRACT OF THE DISCLOSURE

In electrical devices, particularly miniaturized potentiometers, including a housing, an electrical component contained within the housing, and a conductive lead element extending through a wall of the housing and connected to the electrical component, the housing is made in two thermoplastic parts, one of which includes an opening which accommodates the lead element and has a transversely enlarged portion opening toward the interior of the housing. The lead element has an enlargement accommodated by the enlarged portion of the opening. The other housing part includes a wall portion which extends across the enlarged portion of the opening. The two housing parts are fused together, as by sonic welding, and the fused thermoplastic material surrounds a portion of the enlargement of the lead element, locking the enlargement in place.

---

This invention relates to electrical devices of the type comprising a hollow housing of insulating material, at least one electrical component mounted in the housing, and at least one electrical lead element extending through a wall of the housing and connected to the components. Though more generally applicable, the invention finds particular application to rectilinearly adjustable potentiometers, especially miniaturized potentiometers.

In providing electrical devices of the type referred to, prior-art workers have encountered difficulty in devising a truly satisfactory lead arrangement. Ideally, the lead element or elements for such devices should be fixedly secured to the housing so that forces applied to the lead element exteriorly of the housing are absorbed mainly by the housing rather than being imparted to the electrical component to which the lead element is connected; there should be a seal between the lead element and the housing adequate at least to prevent entry of foreign matter into the housing; and, particularly in the case of miniaturized potentiometers, the lead element should afford some significant mechanical support for the electrical component to which it is connected. Efforts have been made to provide such lead element arrangements in various ways, including use of tapered lead elements forced into wedging engagement in tapered openings in the housing wall, and use of malleable lead elements forced into openings in the housing wall which are of small enough transverse dimension to deform the malleable lead element as it is inserted. However, the methods and constructions heretofore proposed have not proved to be completely satisfactory.

It is accordingly a general object of the invention to provide an easily and inexpensively manufactured lead-element- and housing structure, suitable for potentiometers and like electrical devices, wherein the lead element is fixedly secured to the housing in an improved manner which also provides a seal between the housing and lead element adequate to prevent entry of foreign matter into the housing.

Another object is to provide a simple method for producing such constructions.

A further object is to provide such constructions embodying an integral lead element which affords positive support for the housed electrical component to which the lead element is connected.

Generally stated, devices according to the invention employ an elongated integral metal lead element having a transverse extension, advantageously in the nature of a crossbar, intermediate the ends of the lead element, and the housing includes two parts (e.g., a base and a hollow cap) of thermoplastic polymeric material, with a first housing part having a through opening through which a significant portion of the lead element extends, this opening being enlarged transversely where it opens into the interior of the housing, the enlargement of the opening being so shaped and dimensioned as to accommodate the transverse extension on the lead element. Before the two housing parts are fitted together, the lead element is inserted into the opening until the transverse extension on the lead element engages the wall presented by the bottom of the enlargement of the through opening. Two housing parts are then fitted together, with a wall portion of the second housing part overlying and directly engaging the transverse extension on the lead element. With the parts in the initial positions just described, the portions of the second housing part engaged respectively with the first housing part and the lead element extension are raised to the fusion point of the polymeric material, as by sonic welding techniques, while the two housing parts are urged toward each other. As a result, as the two housing parts are fued together, a portion of the transverse extension of the lead element is embedded in the polymeric material fused from the second housing part and, once the parts are cooled so that the fused polymeric material has again become rigid, the transverse extension of the lead element is locked rigidly and permanently against the bottom of the enlargement of the through opening. Since the fused polymeric material in which the lead element extension is partially embedded does not necessarily extend over the entire enlargement of the through opening, a perfect fluid-tight seal is not achieved between the lead element and the housing. However, by being partly embedded in the fused material of the second housing part as the two housing parts are urged together, the transverse extension of the lead element is so securely locked against the bottom wall as to prevent passage of foreign material into the housing via the through opening which accommodates the lead element.

In order that the manner in which the foregoing and other objects are attained in accordance with the invention can be understood in more detail, particularly advantageous article and method embodiments thereof will be described with reference to the accompanying drawings, which form a part of this specification, and wherein:

FIG. 1 is a longitudinal sectional view of a potentiometer constructed in accordance with one article embodiment of the invention;

FIG. 2 is a transverse sectional view of the potentiometer of FIG. 1;

FIG. 3 is a side elevational view of the movable contact unit and a portion of the lead screw of the device of FIG. 1;

FIG. 4 is a perspective view of a subassembly employed in the potentiometer of FIG. 1 and comprising a return conductor and its lead element;

FIG. 5 is a top plan elevational view of the base of the potentiometer of FIG. 1, with the resistance element and return conductor mounted thereon;

FIG. 6 is a fragmentary view of a portion of a lead element installed in accordance with the invention, the lead element being in side elevation and the material of the casing broken away for clarity;

3

FIG. 7 is a fragmentary view similar to FIG. 6 but showing the lead element in edge elevation;

FIG. 8 is a side elevational view illustrating a modified mounting arrangement for the return conductor of a potentiometer otherwise constructed as shown in FIG. 1;

FIG. 9 is a transverse cross-sectional view of another form of movable contact unit which can be employed in the potentiometer of FIG. 1;

FIG. 10 is a top plan elevational view of a movable contact member employed in the device of FIG. 9;

FIG. 11 is a side elevational view of the movable contact unit of FIG. 9;

FIG. 12 is a view similar to FIG. 11 but showing the unit in modified form; and

FIGS. 13A–13E constitute a sequence diagram illustrating one particularly advantageous method embodiment of the invention.

Referring now to the drawings in detail, FIGS. 1–7 illustrate application of the invention to a miniaturized rectilinear potentiometer having a housing 40 which comprises a base 41 of rectangular plan configuration, and a hollow cover or cap 42 secured to the base so that the base and cap define a generally rectangular cavity. Base 41 can be considered as providing one wall of the housing and this wall can be viewed as the bottom in the normal position of installation. Cap 42 includes a flat top wall 43, flat side walls 44 and 45, and end walls 46 and 47.

At its top, base 41 is provided with a continuous peripheral upstanding flange 48 having a narrow flat top surface and a downwardly and inwardly slanting inner face. The lower edges of side walls 44, 45 and end walls 46, 47 are peripherally notched to accommodate the flange 48. Base 41 and cap 42 are formed of a suitable thermoplastic polymeric insulating material and the two members are secured rigidly together, in sealed fashion, by ultrasonic welding in the manner hereinafter described. Thus, all of the interengaging surface portions of base 41 and cap 42 are fused together.

In that area enclosed by cap 42, base 41 is provided with a rectangular portion 49 which projects upwardly only slightly above the common plane of the fused junction between the base and the lower edge portions of the side and end walls. Portion 49 presents a flat upwardly facing surface 50. Adjacent side wall 44, an upstanding rib 51 extends parallel to the side wall. Rib 51 is of rectangular cross section and is interrupted by three notches 52–54 which extend downwardly completely to surface 50. A groove 55, of arcuate transverse cross section, extends lengthwise of rib 51 parallel to wall 44 and opening upwardly. The width of rib 51 is substantially smaller than the width of surface 50, so that a substantial portion of that surface is clear and uninterrupted, between the side surface 56 of rib 51 and the side wall 45 of cap 42. At the end of base 41 adjacent end wall 46, the base is provided with an upstanding pedestal 57 which joins the adjacent end of rib 51 and includes a flat surface 58 extending across the adjacent end of groove 55. Pedestal 57 projects well above rib 51, for a purpose hereinafter described.

Base 41 is provided with three lead-accommodating openings or bores 59–61 which are identical and of rectangular transverse cross-section. Bores 59–61 extend completely through the base at right angles to the plane thereof. Bore 59 is located in centered alignment with respect to notch 53 in rib 51 and is approximately centered below the inner face of side wall 44 of cap 42. At its upper end, bore 59 is enlarged rectangularly, in a direction which is longitudinal with respect to the housing, the enlargement extending equally in both directions from the main portion of the bore and thus providing a rectangular recess 62 which is centered on the main portion of bore 59 and opens upwardly. Bores 60 and 61 are provided with recesses identical to recess 62.

Over most of its length, bore 59 is of uniform rectangular transverse cross-section, being defined by straight, flat side walls. Transversely of housing 40, recess 62 has a width equal to that of the rest of bore 59. Accordingly, the bottom of the recess can be considered as a flat wall centrally interrupted by the bore, or as to flat shoulders, one on each side of the bore. In all events, the bottom of the recess faces toward the cap 42.

Rib 51 supports a return conductor 63. Return conductor 63 is in the form of a straight piece of wire of circular transverse cross section and of such diameter as to be accommodated by groove 55. The end of conductor 63 which is adjacent end wall 46 directly engages the face 58 of pedestal 57. The opposite end of the return conductor is spaced inwardly from end wall 47.

As best seen in FIG. 14, return conductor 63 is equipped with a lead element 64. Element 64 is made as an integral unit from suitable metal of good electrical conductivity and good strength. The element includes an elongated straight shank portion 65 of rectangular cross section, a relatively shorter cross-bar portion 66 which is also of rectangular cross section, and a thin tip portion 67. The central portion of cross-bar 66 lies in the same plane as shank 65, but the end portions 66a of the cross-bar are bent to project at right angles to that plane, both end portions projecting in the same direction. The cross-bar is of rectangular transverse cross section and of the same thickness as shank 65. One face of the central portion of cross bar 66 is coplanar with one major face 68 of shank 65. The tip 67 joins cross-bar 66 at the midpoint of the cross-bar but is offset transversely so that one major face of the tip joins the cross-bar in a line which lies in the plane of major face 68. The tip 67 slants away from the lead element on the side thereof which is occupied by face 68. The free end of tip 67 is welded to the return conductor 63 at a point intermediate the ends of the return conductor. Lead element 64 is so oriented relative to the return conductor that the major surface of tip 67 which faces in the same direction as does face 68 engages the return conductor.

During assembly of the potentiometer, at a time before cap 42 has been applied to base 41, lead 64 is inserted downwardly into bore 59 until cross-bar 66 seats in recess 62, the lower faces presented by the arms or end portions of the cross-bar directly contacting the bottom of the recess 62 in flush engagement. The effective length and slanting disposition of tip 67 are such that, when cross-bar 66 is first seated within recess 62, and before ultrasonic welding of the cap to the base has been accomplished, the return conductor 64 is approximately seated in groove 55, that is, the ends of the cross-bar engage the flat bottom wall of the recess. Shank 65 extends with its major face 68 in flush engagement with the adjacent side of the main portion of bore 59. The length of shank 65 is such that, when cross bar 66 is seated in recess 62, a major portion of shank 65 extends beyond the lower surface of base 41.

Considering FIGS. 5–8, it will be apparent that the shank 65 of lead element 64 is not as thick in a direction transversely of the housing as the main portion of bore 59 is wide in that direction. And, since the central portion of cross bar 66 has the same thickness as does the shank of the lead element, the cross bar does not itself fully close the lead-element-accommodating bore. However, at each end of recess 62, the curved end portions 66a of the cross bar 66 substantially fill the recess. As later described, the upper portion of cross bar 66 is embedded in polymeric material thermally fused from the corresponding wall portion of cap 42, the fused material, on cooling again to the right state, closing the space between and around the end portions 66a of the cross bar 66.

An elongated resistance element 70, of conventional wire-wound construction and circular transverse cross section, extends along surface 50 and in engagement with the side surface 56 of rib 51. One flat end face of the resistance element directly engages pedestal 57. The other end face of the resistance element lies in a common plane with the corresponding end face of return conductor 63. The dimensions of rib 51, return conductor 63, and resistance element 70 are such that movable contact elements, later described, which lie in a common plane parallel to surface 56 can simultaneously engage the return conductor and the resistance element, as will be clear from FIG. 2.

Resistance element 70 is equipped with two lead elements 71 and 72 which are in all respects identical with lead element 64 save that their thin tip portions 73 and 74, respectively, do not slant away from the other portions of the lead elements. While lead element 64 is welded to return conductor 63 prior to insertion of the lead element 64 into bore 59 in base 41, welding of lead elements 71 and 73 to the resistance element 70 is accomplished after these lead elements and the resistance element have been put in place. Thus, lead element 71 is inserted downwardly into bore 60, lead element 72 is inserted downwardly into bore 60, lead element 72 is inserted downwardly into bore 61, the resistance element is properly disposed on surface 50, and tip portions 73 and 74 of the lead elements are then welded to the resistance element, notches 52 and 54 affording access to the resistance element for accomplishing and welding operations. Though other means can be employed to secure resistance element 70 to base 41, it is advantageous to rely on lead elements 71 and 72, the welds between the lead elements and the resistance, and the rigid attachment of the lead elements to base 41, as the sole means for supporting and securing resistance element 70 in its position on base 41.

End wall 47 of cap 42 includes a thicker portion 75, adjacent top wall 43, and a thinner portion 76, which includes the free edge of the end wall. The thicker portion 75 is provided with a circular, outwardly opening recess 77, and a cylindrical through bore 78 which is coaxial with recess 77. Adjacent end wall 46, cap 42 is provided with a flange 79 which depends from top wall 43 and is parallel with end wall 46. Flange 79 is of such length that, when cap 42 is in its finally installed position on base 41, the free end of flange 79 will be spaced slightly above the upper end of pedestal 57. A generally U-shaped notch 80 is provided in flange 79, the notch opening away from top wall 43. The bottom of notch 80 is beveled, as indicated at 81, the bevel extending for approximately half the thickness of the flange and slanting upwardly and away from end wall 46.

The potentiometer includes a metal lead screw 82 having a threaded body portion 83, an enlarged head 84 which is slotted at 85 to cooperate with a screwdriver or like turning tool, a plain right cylindrical portion 86 between head 84 and threaded body portion 83, and a tip flange 87 at the end of the lead screw opposite head 84, there being a short right cylindrical portion 88 between tip flange 87 and the threaded body of the lead screw. The lead screw is inserted into cap 42 before the cap is applied to base 41. An O-ring 89 is first placed on the lead screw in a position surrounding cylindrical portion 86. The lead screw is then inserted through bore 78 in end wall 47 until O-ring 89 is engaged between head 84 and the bottom of recess 77. As the lead screw approaches full insertion, the end thereof carrying flange 87 is pivoted away from top wall 43, such pivotal movement being allowed by reason of a slight clearance between circular portion 86 and the wall of bore 78 and a similar clearance between the periphery of circular head 84 and the side wall of the circular recess 77. With the lead screw so pivotally displaced, additional pressure is applied thereto in order to initially compress O-ring 89 and bring flange 87 to a location such that the lead screw can be pivoted toward top wall 43, with cylindrical portion 88 entering into notch 80 and the tip flange 87 engaging the side of flange 79 which is directed toward end wall 46. Such engagement between the tip flange 87 and flange 79 holds O-ring 89 under compression.

Lead screw 82 drives a movable contact unit indicated generally at 90 and shown in FIGS. 1–3. Unit 90 comprises an insulating member, indicated generally at 91, and a contact member indicated generally at 92 and formed as an integral unit from spring sheet metal.

Insulating member 91 is formed as an integral piece of suitable polymeric insulating material, such as polytetrafluoroethylene. Member 91 comprises a thin tubular body portion 93 which, in its normal relaxed or undistorted condition, is in the form of a right cylindrical tube. At the ends of body portion 93, member 91 is provided with flanges 94 and 95, respectively, these flanges each having a circular aperture of the same size as, and aligned with, the inner periphery of tubular body portion 93. Flange 94 is relatively thicker than flange 95 and has a rectangular peripheral shape corresponding to that defined by the inner surfaces of cap 42. Thinner flange 95 is circular. Considering insulating member 91 as a whole, the member can be said to have a through bore, defined by the openings in the end flanges and the interior of tubular body portion 93. The through bore is of such diameter that the member can be slipped easily over the threaded body portion 83 of the lead screw and, advantageously, will then embrace the crest of the thread of the lead screw with a light sliding contact.

Contact member 92 includes a flat body portion 96 which is generally rectangular. A pair of contact arms 97 and 98 are bent from a common edge of the body portion 96 of the contact member and extend in generally S-like configuration to terminate in contact tips 99 and 100, respectively. Contact tips 99 and 100 are curved cylindrically, with a common axis extending parallel to the plane of body portion 96.

The edge of body portion 96 from which the two contact arms are bent extends transversely of the elongated potentiometer when the movable contact unit is in its operative position. Two of the three remaining edges of body portion 96 extend parallel to each other and at right angles to the edge from which the contact arms are bent. From one of these two edges, there is bent upwardly from body portion 96 an arm 101. Similarly, an arm 102 is bent upwardly from the other of the two parallel edges just mentioned. Arms 101 and 102 converge away from body portion 96. Arm 101 is provided with a straight dimple 103 which is of circular transverse cross section and which slants at an angle, relative to body portion 96, which is essentially the same as the angle of the thread of the lead screw.

With contact member 92 in its normal relaxed or undistorted condition, the space between arms 101 and 102 (taking dimple 103 into consideration) is inadequate to accommodate the thin tubular body portion 93 of insulating member 91 when body portion 93 is in undistorted condition. Due to the resilient nature of arms 101 and 102, the contact member 92 can be forced onto the body portion of member 91, reaching the position seen in FIG. 2. With the parts in such assembled relation, the spring force provided by arms 101 and 102 urges dimple 103 against the outer surface of tubular body portion 93 and, because of the thin flexible nature of the tubular body portion 93, a small delineated area thereof is distorted inwardly by dimple 103.

Considering FIG. 1, it will be noted that the thread of lead screw 83 has a substantial pitch and that the crest of the thread is of well rounded transverse cross section. Accordingly, adjacent turns of the thread are spaced apart by a substantial distance, and the thread presents no sharp edges. Considering FIG. 3, it will be seen that the width of dimple 103 is significantly smaller than the space between adjacent turns of the lead screw thread. Accordingly, the portion of body portion 93 of member 91 which is distorted inwardly by dimple 103 extends substantially entirely into the space between the two adjacent turns of the thread, and the action of the dimple is not to force the flexible insulating material of member 91 against the crest of the thread.

From FIGS. 1 and 3, it will be seen that the width of arms 101 and 102, that is, the dimension of those arms in the direction of the axis of the lead screw in the completely assembled device, is slightly less than the space between flanges 94 and 95. Hence, the two arms engage body portion 93 over most of the length of the body portion, yet are freely accommodated between the two flanges. The overall length of body portion 93 is such that the body portion embraces more than three full turns of the thread of the lead screw. Save for the presence of dimple 103, arms 101 and 102 apply only a light inward spring pressure against the tubular body portion 93 and the body portion is in turn supported against this pressure by the rounded crest of the lead screw thread. The arrangement is such that the rounded crest of the thread slidably supports the tubular body portion 93, without the tubular body portion being significantly distorted, save by the dimple 103.

From FIG. 2 it will be seen that the close proximity between the inner walls of cap 42 and three of the edges of the rectangular flange 94 of insulating member 91 is such that the insulating member, and therefore the entire movable contact unit 90, can rotate about the axis of the lead screw only a minimal amount. Accordingly, whenever the lead screw is rotated in either direction, an edge of flange 94 will come into engagement with the adjacent wall of cap 42, preventing rotation of the movable contact unit, and continued rotation of the lead screw will therefore result in travel of the movable contact unit along the lead screw in a direction depending upon the direction of rotation of the lead screw.

The surface of flange 79 which is directed toward end wall 47 constitutes a stop surface to be engaged by flange 94 of insulating member 91 whenever the rotation of the lead screw in a direction causing the movable contact unit to advance toward flange 79 is continued adequately to provide the necessary travel of the movable contact unit. In the event of continued rotation of the lead screw after such engagement of the flange 94 with flange 79, the resilient nature or arms 101 and 102 allows dimple 103, and the small portion of the wall of tubular body portion 93 which is displaced by the dimple, to ride over the crest of the lead screw thread, thus providing a clutch action which prevents such continued rotation of the lead screw from damaging the potentiometer. Similarly, the surface of the thicker portion 75 of end wall 47 which is directed toward the opposite end of the potentiometer constitutes a stop surface to be engaged by flange 95 of insulating member 91 in the event that the lead screw is rotated in a direction, and to such an extent, as will cause such engagement. In the event of such engagement, a similar clutch action occurs.

Contact arms 97 and 98 are of such dimensions that, when arms 101 and 103 are properly engaged with insulating member 91, contact tips 99 and 100 slidably engage return conductor 63 and resistance element 70, respectively, and are urged resiliently thereagainst by reason of compressive deformation of the two contact arms. Since the contact member 92 is an integral metal piece, such engagement of tips 99 and 100 with the return conductor and the resistance element is effective to establish an electrical connection between the resistance element and the return conductor at the particular point at which the movoble contact unit is then positioned. Insulating member 91 acts to completely isolate the movable contact member 92 electrically from the metal lead screw and, accordingly, the only exterior electrical connections involved are those established via lead elements 64, 71 and 72.

The final positional relationship between the lead screw, the movable contact unit, the return conductor and the resistance element is established by securing cap 42 to base 61. Employing ultrasonic welding techniques, the base 41 is stationarily supported, as in a jig, the cap 42 is properly positioned on the base, and an ultrasonic tool is employed to vibrate the cap at a suitable high frequency while a downward pressure is applied to the cap. Frictional forces occurring at the free edges of walls 44–47 and the mating surface portions of the base generate heat adequate to raise the temperature of the thermoplastic material of the base and cap, in the location of the free edges just mentioned, to the fusion point and the cap is accordingly fused to the base. Since downward pressure is applied to the cap during this operation, fused material provided by the cap is caused to flow around the cross bars of lead elements 64, 71 and 72, so that the upper portions of the cross-bars are, in effect, embedded in the fused polymeric material, as seen in FIGS. 12 and 13. Since the fused polymeric material at the location of each of the cross-bar-accommodating recesses comes from the lower edge portion of the respective sidewall 44, 45, and since, as seen in FIGS. 2 and 7, the cross-bar-accommodating recesses are offset inwardly from the respective side wall so that the side wall overlaps approximatedly one-half of the recess, the fused polymeric material does not completely close the top of the recess. The polymeric material does, however, completely enclose the upper edge portions of the curved ends 66a and completely fill the space between those ends. Further, the bottom surface 66b, FIG. 4, of each cross-bar is held firmly against the flat bottom wall of the recess, first by the downward force applied to cap 42 and then permanently by the fused polymeric material which surrounds the upper portion of the cross-bar. It is to be noted that face 68 of the shank 65 of the lead element, and the corresponding face of the cross-bar 66, lie in flush engagement with the inner wall of the bore 59, this benig the wall spaced inwardly from the respective side wall. Accordingly, for each lead element 64, 71 and 72, the cross-bar of the lead element, the bottom wall of the cross-bar-accommodating recess, the inner will of the lead element-accommodating bore, and the fused polymeric material in which the cross-bar is embedded coact to provide a seal, between the lead element and the casing, which is effective to prevent foreign material from entering the casing. The ultrasonic welding operation results in final seating of the cross-bars in their respective recesses, and final seating of the return conductor in groove 55. The return conductor is accordingly rigidly supported intermediate its ends, by reason of being welded to the now-rigidly supported lead element 64, and each end portion of the return conductor is in turn supported by the corresponding bottom portion of groove 55. It is unnecessary to employ adhesive or other securing means for the return conductor.

Since the O-ring 89 is held under compression between the head of the lead screw and the bottom wall of recess 77, and since the ultrasonic welding operation employed to secure cap 42 to base 41 provides a continuous fused joint between the cap and base, the cavity defined by the housing is effectively sealed against entry of foreign material.

With cap 42 in its final position on base 41, the tip flange 87 of the lead screw is disposed immediately adjacent to the upper end face of pedestal 57. Accordingly, the pedestal is effective to assure retention of cylindrical portion 88 of the lead screw in notch 80.

In the embodiment shown in FIG. 8, the return conductor 63a is welded as hereinbefore described to the tip portion 67a of lead element 64a. One end portion of return conductor 63a is supported by engagement with the pedestal 57a and a short, grooved rib portion 51a, as hereinbefore described with reference to the construction shown in FIGS. 1–7. The other end of the return conductor 63a, however, simply rests upon the flat upper face of the second short rib portion 51b, this rib portion having no groove, and there being no other rib portion employed.

FIGS. 9–11 illustrate a movable contact unit, indicated generally at 104, constructed in accordance with another embodiment of the invention. Here, the unit again comprises an insulating member 105 and a contact member 106. Insulating member 105 is formed as an integral piece from polytetrafluoroethylene or other suitable flexible polymeric material, and comprises a thin tubular body portion 107 and identical circular end flanges 108 and 109 which are annular and project outwardly from the respective ends of the tubular body portion 107.

Contact member 106 is formed as an integral piece from thin spring sheet metal of good electrical conductivity. The contact member comprises a rectangular base portion 110, contact arms 111 and 112, and two additional arms 113 and 114 which extend upwardly from base portion 110, that is, from the side thereof which is opposite contact arms 111 and 112. Arm 113 is provided with a straight elongated dimple 115 extending at an angle, relative to base portion 110, which conforms to the angle of the thread of lead screw 116.

The tubular body portion 107 of insulating member 105 is slipped over lead screw 116, so that the inner surface of the body portion lightly embraces the crest of the thread of the lead screw. Arms 113 and 114 of movable contact member 106 converge at an angle such that, with tubular body portion 107 supported on the lead screw, the tubular body portion can be accommodated between arms 113 and 114 only when those arms are distorted resiliently away from each other. Accordingly, the movable contact member 106 is applied to the insulating member by spreading arms 113 and 114 apart and forcing them over the body portion of the insulating member, until the contact member reaches the fully engaged position seen in FIG. 9. With the parts so disposed, dimple 115 is effective to distort a relatively small portion of the wall of tubular body portion 107 inwardly into the space between adjacent turns of the lead screw thread, so that the movable contact unit is operatively coupled to the lead screw.

To prevent the movable contact unit from turning with the lead screw in this embodiment of the invention, each contact arm 111, 112 is provided with a rounded portion disposed to come into direct sliding engagement with the respective adjacent side wall 117, 118 of the casing in the event that the movable contact unit commences to rotate in the corresponding direction. As seen in FIG. 9, contact arms 111, 112 have flat rectangular body portions extending from bends 119, 120, respectively, at an acute angle relative to base portion 110, as seen in FIG. 11. The free end portions of arms 111, 112 terminate respectively in integral contact tips 121, 122 which are bent cylindrically about an axis transverse to the contact arms and are concave with respect to base portion 110. Contact tips 121, 122 project outwardly beyond the outer edges of the respective contact arm body portions so that, in the assembled device, the outer ends of the contact tips are immediately adjacent to but spaced slightly from casing side walls 117, 118, respectively, when the contact arms are parallel with the side walls and tips 121 and 122 are properly engaged with return conductor 123 and resistance element 124, respectively. The entire outer end portion of each contact tip 121, 122 is bent circularly toward base portion 110, providing the rounded portions 125 and 126, respectively. Since these end portions are initially part of the right cylindrical contact tip, extending through 180°, and since the entire end portion is bent circularly, the rounded portions 125 and 126 present only smooth curved surfaces to engage side walls 117, 118, and engagement of one of the rounded portions 125, 126 with the adjacent sidewall will not significantly impede travel of the movable contact unit along the lead screw.

Provision of the rounded, side wall-engaging portions 125, 126 at the free ends of the contact arms is particularly advantageous because the side wall-engaging portions are disposed at the maximum practical distance from the central axis of the lead screw. Thus, even a relatively small amount of rotation of the movable contact unit provides the angular displacement of the contact tips necessary to cause the appropriate one of portions 125, 126 to come into engagement with the respective one of side walls 117, 118.

The form of the lead elements 64, 71, 72, FIGS. 4, 6 and 7, is particularly advantageous in that it allows the lead element to be made integrally from a single piece of metal stock by simple and conventional metal working operations, yet presents a configuration particularly well suited for carrying out the method of the invention. The method can, however, be carried out with the lead element in a different form, so long as the lead element includes a shank capable of extending through and beyond the base or like housing part, a transverse extension extending for a significant distance from the shank in at least one direction, and a trip which will project into the interior of the housing by a distance adequate for connection to the electrical component involved.

The method aspects of the invention are illustrated in the sequence diagram of FIGS. 13A–13E, and commence with the step of providing a first housing part, such as the base 41 of the potentiometer of FIG. 1, with that part having a through opening provided with a transverse enlargement at the end of the through opening which will open into the interior of the housing when the device is completed. The shape of the transverse enlargement of the through opening is such that the transverse extension or cross-bar of the lead element, e.g., cross-bar 66, FIG. 4, can be accommodated by the transverse enlargement. Advantageously, the transverse extension should be relatively closely embraced by the side walls of the transverse enlargement of the through opening.

The lead element is inserted downwardly through the through opening, as seen in FIG. 13B of the sequence diagram, until the transverse extension of the lead element engages the bottom of the enlargement of the through opening. When so engaged, the cross-bar or transverse enlargement is advantageously disposed with its upper surface substantially aligned with the adjacent portion of the upper surface of the housing part through which the through opening extends, though it is permissible to have the cross-bar or enlargement project slightly beyond, or be spaced slightly below, that upper surface portion.

As seen in FIG. 13C, the electrical component (such as resistance element 70, FIG. 2) which is to be enclosed within the housing is put in place and the tip of the lead element is connected thereto by a fused metal joint, advantageously by welding. An advantage of the method is that the electrical component can be fully mounted on the base or other housing part in this step of the method, the weld or like fused metal joint, plus the rigidity and strength of the lead element serving to provide mechanical support for the electrical component, which support, as and if required by the particular circumstances, can be supplemented by direct engagement between the electrical component and a part of the housing, illustrated by engagement between the resistance element 70 and surfaces 50, 56 of the base in the case of the potentiometer of FIGS. 1–7.

Alternatively, the electrical component can be welded or otherwise mechanically and electrically connected to the lead element tip before the lead element is inserted in the through opening of the housing part. This procedure is illustrated by the provision of the return conductor-lead element subcombination shown in FIG. 4, before the lead element is inserted through opening 59 in the potentiometer base. Again, the fused metal joint and the rigidity of the lead element afford mechanical support for the return conductor and that support is supplemented by direct contact between the return conductor and pedestal 51 of the base in the completed device.

As the next step, a second housing part, such as the cap 42 of the potentiometer of FIG. 1, is provided and includes a wall portion, such as the appropriate portion of side wall 45 in the potentiometer of FIGS. 1–7, capable of extending across the transverse enlargement of the through opening and overlying a portion of the cross-bar or extension when this housing part is properly placed on the base or other part presenting the through opening. The second housing part is then engaged with the base to provide the relationship just mentioned, as seen in FIG. 13D.

To complete the method, a force is applied to the two housing parts in such fashion as to force them together, and a fused joint is established between at least the wall portion of the second housing part which extends across the enlargement of the through opening, on the one hand, and the opposing portion of the first housing part. Though this step can be accomplished in other ways, as by use of a polymeric cement, it is particularly advantageous to employ sonic welding techniques as hereinbefore described, with the two housing parts being forced together while one part is subjected to sonic vibration to generate adequate frictional heat, at the interface between the two parts, to fuse the thermoplastic polymeric material of the vibrated part at the interface and thus not only create a fused joint between the two housing parts but also cause the upper portion of the transverse extension or cross-bar of the lead element to be partially embedded in the fused polymeric material, so that the final reltionship seen in FIG. 13E is obtained in the finished product.

It is of particular significance that the method allows the tip of the lead element to extend freely into the cavity of the housing (by reason of the nature of the enlargement of the through opening, the position of the tip relative to the transverse extension or cross-bar, and the overlapping disposition of the edge portion of the wall of the second housing part) even though the through opening is effectively closed by the cooperation of the transverse extension or cross-bar, the fused polymeric material, and the walls of the transverse enlargement itself.

The embodiment of the invention illustrated in FIG. 12 employs a lead screw 216 with a thread of triangular cross section, so that the crest of the thread is sharp and capable of readily penetrating the wall of the insulating member 205. Arm 213 of movable contact member 206 is provided with an elongated straight dimple 215 which is parallel to the side edges of arm 213. Accordingly, when the movable contact unit 204 is assembled as shown, dimple 215 lies in a plane which extends at right angles to the longitudinal axis of the lead screw, and the portion of the wall 207 of member 205 which is deformed by the dimple therefore crosses the sharp crest of the lead screw thread twice (once for each of two adjacent turns of the thread). The force applied to wall 207 by the dimple and arm 213 is adequate to cause the crest of the lead screw thread to be embedded in the polymeric material of wall 207 at both points of crossing. In effect, the deformed portion of wall 207 assumes the configuration of the lead screw thread, so that the lead screw is operatively coupled to the insulating member 205 and therefore to the entire movable contact unit 204.

Attention is called to my copending applications Ser. No. 702,950, filed Feb. 5, 1968, directed to the movable contact units described herein, and Ser. No. 702,906, filed Feb. 5, 1968 directed to the combination of the return conductor, corresponding lead element, and supporting housing parts.

While particularly advantageous embodiments of the invention have been chosen for illustrative purposes, it will be obvious to those skilled in the art that various changes and modifications can be made therein without departing from the scope of the invention as defined in the appended claims. Thus, for example, the wire wound resistance elements shown and described herein can obviously be replaced by metallic film resistance elements or cermet resistance elements, for example.

What is claimed is:

1. In an electrical device of the type comprising a hollow, insulating housing and an electrical component disposed within the housing and to which connection is to be made from outside the housing, the combination of two parts of electrical insulating material coacting to define at least a portion of the housing, one of said parts having a lead-element-accommodating opening therethrough which includes a transverse enlargement opening toward the interior of the housing; and a conductive lead element extending through said opening and including a transverse extension, said transverse extension being seated in said transverse enlargement of said opening, a portion of said lead element projecting outwardly away from the housing and another portion of said lead element extending from said one housing part inwardly of the housing for connection to the electrical component, the other of said housing parts including a portion which overlies said transverse extension, said transverse extension being partially embedded in said other housing part, and said two housing parts being secured rigidly together and said transverse extension of said lead element being clamped against the bottom of said transverse enlargement of said lead-element-accommodating opening by said other housing part.

2. The combination according to claim 1, wherein said two housing parts are of polymeric thermoplastic material and are fused together, and a portion of said transverse extension of said lead element is embedded in fused material of said other part adjacent the fused junction between said parts.

3. The combination according to claim 1, wherein said transverse enlargement opens through a surface portion of said one housing part, said other housing part includes a wall portion which extends across and partially covers said transverse enlargement, and the combination of said transverse extension of said lead element and said wall portion substantially closes said transverse enlargement.

4. The combination according to claim 1, wherein said lead element is an integral metal piece and comprises an elongated shank, said shank and said transverse extension are of substantially the same thickness, said extension extends across said shank in the nature of a cross-bar, and the end portions of said extension are bent laterally relative to the remainder thereof.

5. The combination according to claim 4, wherein said other portion of said lead element is a flat thin tip portion extending from said transverse extension and having one of its major surfaces disposed as a continuation of one of the side surfaces of said transverse extension.

6. The combination according to claim 5, wherein the thickness of said tip portion is markedly smaller than the thickness of said transverse extension, said portion of said other housing part is a wall portion, and said wall portion overlies and engages said transverse extension throughout the entire length of said extension so as to completely bridge the space between said laterally bent end portions thereof.

7. The combination according to claim 6 wherein said opening is of rectangular transverse cross-section, said shank is of rectangular transverse cross-section, and said one side surface of said transverse extension and the corresponding side surface of said shank lie in flush engagement with the corresponding wall of said opening.

8. In a rectilinearly adjustable potentiometer, the combination of an insulating housing comprising a base and a hollow cap, said cap having spaced side walls and spaced end walls, said side and end walls engaging the top of said base and being secured rigidly to said base by a continuous joint; an opening extending upwardly through said base in a location intermediate the ends thereof and adjacent one side thereof, said location being such that the corresponding one of said side walls of said cap partially overlaps the inner end of said opening, said inner end of said opening being transversely enlarged to provide a recess which is partially covered by said one side wall and partially open to the interior of said housing; an integral metal lead element including a tip, a transverse extension, and an elongated shank, said extension being disposed at the juncture between said tip and said shank, said extension being seated in said recess, said shank extending from said recess outwardly through said opening and being of such length as to project away from the base, said tip projecting into the interior of said housing; and a return conductor disposed within said housing and extending lengthwise thereof, said tip of said lead element being connected rigidly and electrically to said return conductor by fused metal at a point intermediate the ends of said return conductor.

9. The combination according to claim 8, wherein said base and said cap are of thermoplastic polymeric material, said joint is a fusion joint, and said transverse extension of said lead element is partially embedded in fused polymeric material from said cap.

10. The combination according to claim 8 and further comprising an elongated resistance element extending lengthwise of said housing beside said return conductor, said base having two additional openings extending upwardly therethrough each adjacent a different end of said resistance element, said additional openings being adjacent the other side of said base in locations such that the other side wall of said cap partially overlaps the inner ends thereof, said inner ends each being transversely enlarged to provide a recess which is partially covered by said other side wall and partially open to the interior of said housing; and two additional integral metal lead elements each including a tip, a transverse extension, and an elongated shank, said extensions of said additional lead elements being each disposed in said recess of a different one of said additional openings, said shanks of said additional lead elements each extending from said recess outwardly through the respective one of said openings, said tips of said additional lead elements each projecting into the interior of said housing and each being connected rigidly and electrically by fused metal to a different end portion of said resistance element.

11. The method for assembling an electrical device of the type described comprising providing a base and a hollow cap having at least one wall portion, both said base and said cap being of thermoplastic polymeric electrical insulating material, said base having an opening therethrough which includes a transverse enlargement which opens through the upper surface of said base; inserting downwardly through said opening a conductive metal lead element having a shank, a transverse extention at one end of said shank, and a tip portion projecting away from said extension and shank in a direction generally lengthwise of said lead element, and continuing such insertion until said transverse extension is disposed in said enlargement of said opening and said shank projects away from the lower surface of said base; placing said cap on said base in a position such that an edge of said wall portion extends across a portion of said transverse enlargement of said opening and overlies at least a portion of said transverse extension of said lead element; applying a force to said cap and base in a direction tending to urge said cap and base toward each other; and fusing the polymeric material of said edge of said wall portion, while maintaining said force, whereby said wall portion and said base are fused together, and said transverse extension is partially embedded in the fused polymeric material and held rigidly against the bottom of said enlargement of said opening.

12. The method according to claim 11, wherein said cap includes side walls and end walls presenting a continuous edge, and said continuous edge is engaged with said base, said fusing step being carried out over the entire extent of said continuous edge.

13. In a potentiometer of the type described, the combination of a housing comprising two members of insulating material secured together and cooperating to define an elongated cavity; two supports carried by one of said members of said housing and each located adjacent a different end of said cavity; an opening through said one member, said opening being located between said supports and communicating between said cavity and the exterior of said housing; an elongated return conductor having end portions and an intermediate portion; and a conductive substantially rigid lead element having a shank portion and a tip portion, said lead element being disposed with said shank portion extending through said opening and said tip portion projecting into said cavity, said return conductor being disposed in said cavity and extending lengthwise thereof with each of its end portions engaging and supported by a different one of said supports, said tip of said lead element being electrically connected and mechanically fixedly secured to said intermediate portion of said return conductor by a fused metal joint; said lead element including a lateral projection overlying a surface presented by said one member of said housing, and the other of said two members of said housing engaging over said lateral projection to fix said lead element rigidly to said housing.

References Cited

UNITED STATES PATENTS

| | | | |
|---|---|---|---|
| 2,823,288 | 2/1958 | Bourns et al. | 338—180 |
| 2,860,216 | 11/1958 | Hubbard et al. | 338—180 |
| 2,870,303 | 1/1959 | O'Brian | 338—180 |
| 2,946,975 | 7/1960 | Caddock | 338—183 |
| 3,005,172 | 10/1961 | Bourns et al. | 338—183 |
| 3,134,955 | 5/1964 | Hardison et al. | 338—180 |
| 3,187,289 | 6/1965 | Rolwes | 338—180 |
| 3,233,201 | 2/1966 | Layland | 338—180 |
| 3,413,590 | 11/1968 | Woods et al. | 338—180 |
| 3,416,120 | 12/1968 | Klug et al. | 338—183 |

THOMAS J. KOZMA, Primary Examiner

U.S. Cl. X.R.

338—184, 180; 29—619